United States Patent
Bezos et al.

(10) Patent No.: US 8,678,321 B2
(45) Date of Patent: Mar. 25, 2014

(54) SEA LANDING OF SPACE LAUNCH VEHICLES AND ASSOCIATED SYSTEMS AND METHODS

(75) Inventors: Jeffrey P. Bezos, Greater Seattle, WA (US); Gary Lai, Seattle, WA (US); Sean R. Findlay, Seattle, WA (US)

(73) Assignee: Blue Origin, LLC, Kent, WA (US)

(*) Notice: Subject to any disclaimer, the term of this patent is extended or adjusted under 35 U.S.C. 154(b) by 533 days.

(21) Appl. No.: 12/815,306

(22) Filed: Jun. 14, 2010

(65) Prior Publication Data

US 2011/0017872 A1    Jan. 27, 2011

Related U.S. Application Data

(60) Provisional application No. 61/218,029, filed on Jun. 17, 2009, provisional application No. 61/187,243, filed on Jun. 15, 2009.

(51) Int. Cl.
*B64G 1/00* (2006.01)

(52) U.S. Cl.
USPC .............. 244/158.9; 244/114 R; 244/158.1; 114/261

(58) Field of Classification Search
USPC ..... 244/158.9, 158.1, 3.1, 110 D, 7 B, 114 R, 244/110 E, 171.3, 171.6; 114/258, 261
See application file for complete search history.

(56) References Cited

U.S. PATENT DOCUMENTS

| | | |
|---|---|---|
| 2,464,827 A | 3/1949 | Noyes et al. |
| 2,807,429 A | 9/1957 | Hawkins et al. |

(Continued)

FOREIGN PATENT DOCUMENTS

| | | |
|---|---|---|
| DE | 10058339 A1 | 6/2002 |
| EP | 1340316 A1 | 9/2003 |

(Continued)

OTHER PUBLICATIONS

Solid Rocket Boosters and Post-Launch Processing, FS-2004-07-012-KSC (Rev. 2006), NASA Facts, National Aeronautics and Space Administration, John F. Kennedy Space Center.*

(Continued)

*Primary Examiner* — Rob Swiatek
*Assistant Examiner* — Vincente Rodriguez
(74) *Attorney, Agent, or Firm* — Perkins Coie LLP

(57) ABSTRACT

Launch vehicle systems and methods for landing and recovering a booster stage and/or other portions thereof on a platform at sea or on another body of water are disclosed. In one embodiment, a reusable space launch vehicle is launched from a coastal launch site in a trajectory over water. After booster engine cutoff and upper stage separation, the booster stage reenters the earth's atmosphere in a tail-first orientation. The booster engines are then restarted and the booster stage performs a vertical powered landing on the deck of a pre-positioned sea-going platform. In one embodiment, bidirectional aerodynamic control surfaces control the trajectory of the booster stage as it glides through the earth's atmosphere toward the sea-going platform. The sea-going platform can broadcast its real-time position to the booster stage so that the booster stage can compensate for errors in the position of the sea-going platform due to current drift and/or other factors. After landing, the sea-going platform can be towed by, e.g., a tug, or it can use its own propulsion system, to transport the booster stage back to the coastal launch site or other site for reconditioning and reuse. In another embodiment, the booster stage can be transferred to another vessel for transport. In still further embodiments, the booster can be refurbished while in transit from a sea-based or other landing site.

15 Claims, 2 Drawing Sheets

(56) References Cited

U.S. PATENT DOCUMENTS

| | | | |
|---|---|---|---|
| 2,870,599 A | | 9/1957 | Hawkins et al. |
| 3,210,025 A | | 10/1965 | Lubben et al. |
| 3,286,951 A | | 11/1966 | Kendall et al. |
| 3,295,790 A | * | 1/1967 | Webb .................. 244/158.9 |
| 3,711,040 A | | 1/1973 | Carver |
| 3,903,801 A | | 9/1975 | Senoski |
| 3,966,142 A | | 6/1976 | Corbett et al. |
| 4,896,847 A | | 1/1990 | Gertsch |
| 5,080,306 A | | 1/1992 | Porter et al. |
| 5,318,256 A | | 6/1994 | Appleberry et al. |
| 5,568,901 A | | 10/1996 | Stiennon |
| 5,871,173 A | | 2/1999 | Frank et al. |
| 5,873,549 A | | 2/1999 | Lane et al. |
| 5,927,653 A | | 7/1999 | Mueller et al. |
| 6,176,451 B1 | * | 1/2001 | Drymon .................. 244/3.14 |
| 6,193,187 B1 | | 2/2001 | Scott et al. |
| 6,247,666 B1 | | 6/2001 | Baker et al. |
| 6,454,216 B1 | | 9/2002 | Kiselev et al. |
| 6,666,402 B2 | | 12/2003 | Rupert et al. |
| 6,817,580 B2 | | 11/2004 | Smith |
| 6,926,576 B1 | | 8/2005 | Alway et al. |
| 6,929,576 B2 | | 8/2005 | Armstrong et al. |
| 7,344,111 B2 | | 3/2008 | Janeke |
| 8,047,472 B1 | * | 11/2011 | Brand et al. ............. 244/158.9 |
| 8,408,497 B2 | | 4/2013 | Boelitz et al. |
| 2006/0113425 A1 | | 6/2006 | Rader |
| 2007/0012820 A1 | * | 1/2007 | Buehler .................. 244/158.9 |
| 2008/0078884 A1 | | 4/2008 | Trabandt et al. |
| 2009/0206204 A1 | | 8/2009 | Rosen |
| 2010/0327107 A1 | | 12/2010 | Featherstone |

FOREIGN PATENT DOCUMENTS

| | | |
|---|---|---|
| JP | 2000508601 A | 7/2000 |
| JP | 2001501151 A | 1/2001 |
| JP | 2002535193 A | 10/2002 |
| JP | 2003239698 A | 8/2003 |

OTHER PUBLICATIONS

International Search Report and Written Opinion for International Application No. PCT/US2010/038553, mailed Dec. 15, 2010, 10 pages.

Hare, John "VTVLs as RTLS Boosters," Selenian Boondocks, http://selenianboondocks.com/2010/06/vtvls-as-Ms-boosters/, accessed Jun. 30, 2010, 6 pgs.

U.S. Appl. No. 12/712,083, filed Feb. 24, 2010, Featherstone.
U.S. Appl. No. 12/712,156, filed Feb. 24, 2010, Boelitz.
U.S. Appl. No. 13/968,326, filed Aug. 15, 2013, Featherstone.
U.S. Appl. No. 14/103,742, filed Dec. 11, 2013, Featherstone.

* cited by examiner

SEA LANDING OF SPACE LAUNCH VEHICLES AND ASSOCIATED SYSTEMS AND METHODS

CROSS-REFERENCE TO RELATED APPLICATIONS INCORPORATED BY REFERENCE

The present application claims priority to U.S. Provisional Patent Application No. 61/218,029, filed Jun. 17, 2009 and titled "SEA LANDING OF SPACE LAUNCH VEHICLES AND ASSOCIATED SYSTEMS AND METHODS, INCLUDING EN ROUTE VEHICLE REFURBISHMENT," and U.S. Provisional Patent Application No. 61/187,243, filed Jun. 15, 2009 and titled "SEA LANDING OF SPACE LAUNCH VEHICLES AND ASSOCIATED SYSTEMS AND METHODS," both of which are incorporated herein in their entireties by reference.

The present application incorporates the subject matter of the following patent applications in their entireties by reference: U.S. Provisional Patent Application No. 61/155,115, filed Feb. 24, 2009 and titled "ROCKETS WITH DEPLOYABLE FLARE SURFACES, AND ASSOCIATED SYSTEMS AND METHODS;" U.S. Non-provisional patent application Ser. No. 12/712,156, filed Feb. 24, 2010 and titled "LAUNCH VEHICLES WITH FIXED AND DEPLOYABLE DECELERATION SURFACES, AND/OR SHAPED FUEL TANKS, AND ASSOCIATED SYSTEMS AND METHODS;" U.S. Provisional Patent Application No. 61/187,268, filed Jun. 15, 2009 and titled "BIDIRECTIONAL CONTROL SURFACES FOR USE WITH HIGH SPEED VEHICLES, AND ASSOCIATED SYSTEMS AND METHODS;" and U.S. Non-provisional patent application Ser. No. 12/712,083, filed Feb. 24, 2010 and titled "BIDIRECTIONAL CONTROL SURFACES FOR USE WITH HIGH SPEED VEHICLES, AND ASSOCIATED SYSTEMS AND METHODS."

TECHNICAL FIELD

The present disclosure relates generally to space launch vehicles and, more particularly, to systems and methods for landing space launch vehicles at sea, and/or refurbishing such vehicles en route from a landing site.

BACKGROUND

Rocket powered launch vehicles have been used for many years to carry human and non-human payloads into space. Rockets delivered the first humans to the moon, and have launched many satellites into earth orbit, unmanned space probes, and supplies and personnel to the orbiting international space station.

Despite the rapid advances in manned and unmanned space flight, delivering astronauts, satellites, and other payloads to space continues to be an expensive proposition. One reason for this is that most conventional launch vehicles are only used once, and hence are referred to as "expendable launch vehicles" or "ELVs." The advantages of reusable launch vehicles (RLVs) include the potential of providing low cost access to space.

Although NASA's space shuttle is largely reusable, reconditioning the reusable components is a costly and time consuming process that requires extensive ground based infrastructure. Moreover, the additional shuttle systems required for reentry and landing reduce the payload capability of the shuttle. As commercial pressures increase, the need remains for lower-cost access to space for both human and non-human payloads.

DETAILED DESCRIPTION

Figure 1:
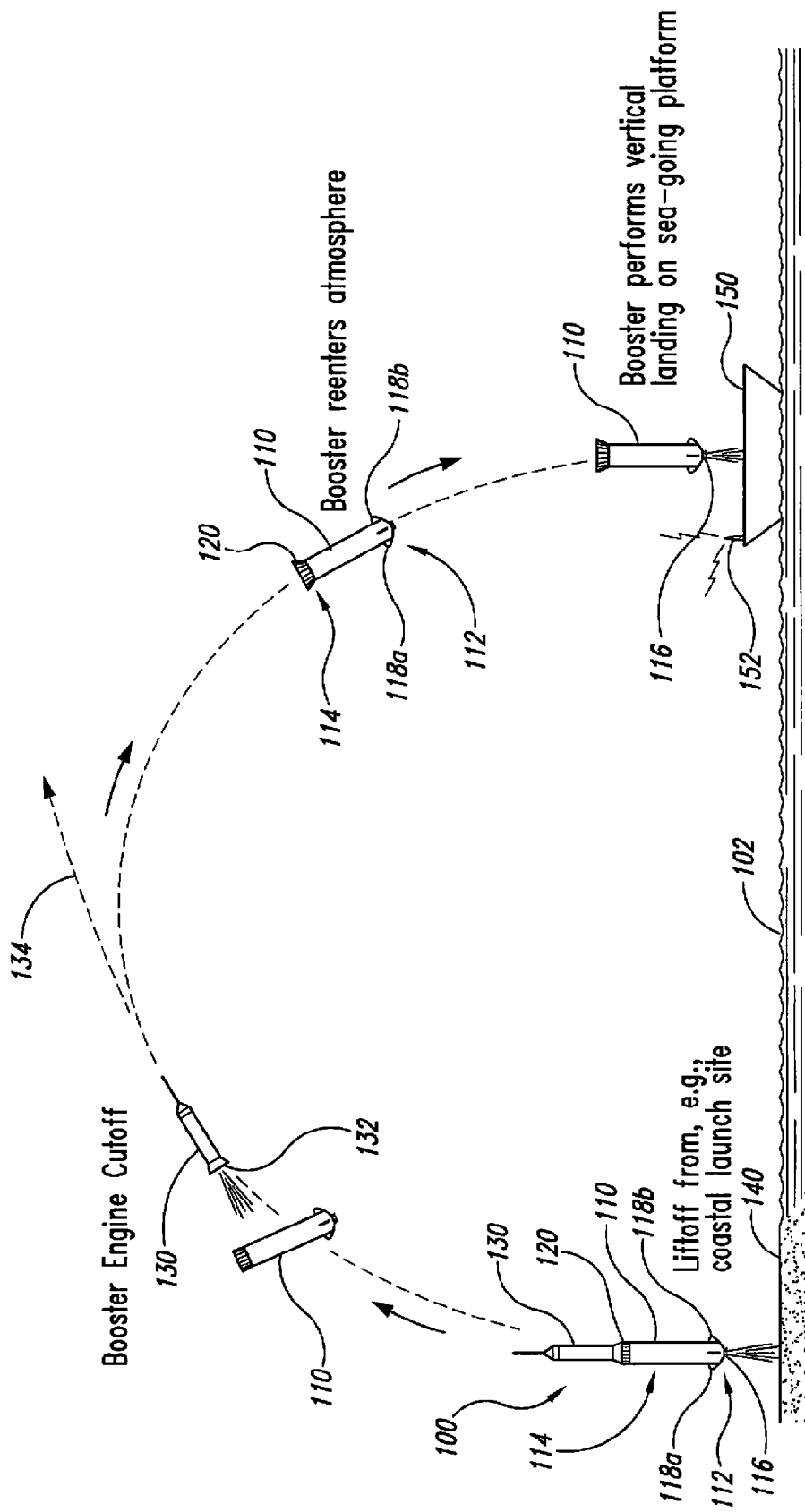
FIG. 1 is a schematic diagram illustrating a mission profile of a space launch vehicle that lands on a sea-going platform in accordance with an embodiment of the disclosure.

Certain aspects of the present disclosure are directed generally to vertical powered landings of reusable launch vehicles on sea-going platforms, and associated systems and methods. Other aspects of the disclosure relate to refurbishing reusable launch vehicles en route from a sea-based or other landing site. Certain details are set forth in the following description and in FIGS. 1 and 2 to provide a thorough understanding of various embodiments of the disclosure. Those of ordinary skill in the relevant art will appreciate, however, that other embodiments having different configurations, arrangements, and/or components may be practiced without several of the details described below. In particular, other embodiments of the disclosure may include additional elements, or may lack one or more of the elements or features described below with reference to FIGS. 1 and 2. Moreover, several details describing structures and processes that are well-known and often associated with space launch vehicles and launching and landing space launch vehicles are not set forth in the following description to avoid unnecessarily obscuring the various embodiments of the disclosure.

In the Figures, identical reference numbers identify identical or at least generally similar elements. To facilitate the discussion of any particular element, the most significant digit or digits of any reference number refers to the Figure in which that element is first introduced. For example, element 110 is first introduced and discussed with reference to FIG. 1.

Space launch vehicles are typically launched from coastal launch sites along flight corridors that take them out and over the ocean for much of their trajectory. This trajectory avoids exposing the public to the potential risks associated with rocket overflight, and results in the booster stage falling into the water. Water landings, however, make reuse of the booster stage costly and difficult for a number of reasons. For example, sea water can be very corrosive to rocket components. Moreover, many of the rocket components get very hot during use, and quenching these hot components in cold sea water can result in cracking and other forms of damage. Recovery and reuse of solid rocket stages after water landings with a parachute is feasible because a solid rocket motor is little more than an empty casing after firing. Liquid-fueled rocket stages, however, are considerably more complex. As a result, few, if any liquid-fueled rocket stages have been reused after water landings.

Concepts exist for landing a booster stage on land. These concepts include landing the booster stage horizontally, like an airplane, or vertically, under its own power or by parachute or other means. All of these approaches, however, limit operational flexibility because they require a ground landing site for every launch azimuth and potential downrange landing area.

Other concepts have been proposed in which the booster stage restarts its rocket engines after separation from the upper stage(s), and then flies back to the launch site. Once at the launch site, the booster stage would either execute a horizontal landing on a runway or a vertical landing by power or other means, such as a parachute. Both of these approaches, however, reduce the payload capability to orbit because they require the rocket to carry a substantial load of propellant to perform the fly-back maneuver.

FIG. 1 is a schematic diagram illustrating a flight profile of a reusable launch vehicle that performs a vertical powered landing on a sea-going platform in accordance with an embodiment of the disclosure. In the illustrated embodiment, a multi-stage orbital launch vehicle 100 includes a first or booster stage 110 and a second or upper stage 130. The booster stage 110 can include an interstage structure comprising deployable aerodynamic surfaces 120 positioned toward a forward end 114, and one or more rocket engines 116 positioned toward an aft end 112. The rocket engines 116 can include, for example, liquid-fueled rocket engines such as liquid oxygen/hydrogen engines, liquid oxygen/kerosene or RP-1 engines, etc. In other embodiments, the rocket engines 116 can include solid propellants. As described in greater detail below, the aft end 112 of the booster stage 110 can also include a plurality of moveable control surfaces 118 (identified individually as control surfaces 118a, 118b, etc.) for controlling both ascent and descent trajectories of the booster stage 110.

Although the upper stage 130 is stacked on top of the booster stage 110 in the illustrated embodiment, in other embodiments the launch vehicle 100 and variations thereof can have other configurations without departing from the spirit or scope of the present disclosure. For example, in one embodiment the upper stage 130 and the booster stage 110 can be positioned side-by-side and attached to each other during ascent with a suitable separation system. In another embodiment, the two or more booster stages 110 or variations thereof can be positioned around the upper stage 130 in a "strap-on" type configuration. Accordingly, the present disclosure is not limited to the particular launch vehicle configuration illustrated in FIG. 1.

In the illustrated embodiment, the launch vehicle 100 takes off from a coastal or other land-based launch site 140 and then turns out over an ocean 102. In one aspect of this embodiment, the sea-going platform 150 can include a broadcast station 152 for communicating its position to the launch vehicle 100 in real-time. This information allows the launch vehicle 100 and/or the booster stage 110 to continuously check and/or adjust its flight path to target the platform 150. If the platform 150 is a freely-drifting craft, the platform 150 can also include a platform position predictor (e.g., a suitable processing device, memory, and associated computer-executable instructions) that automatically predicts a future position of the platform 150 based on various existing conditions such as the strength and direction of the marine current, the strength and direction of the wind, the present rate and direction of drift, etc. For example, the platform position predictor can be configured to predict the position of the platform at the expected time of launch vehicle touchdown. Moreover, the broadcast station 152 can transmit this information to the launch vehicle 100 and/or the booster stage 110 in real-time, so that the launch vehicle 100 and/or the booster stage 110 can utilize this information to adjust its flight path and better target the landing location. After high-altitude booster engine cutoff (BECO), the booster stage 110 separates from the upper stage 130 and continues along a ballistic trajectory. Upper stage engine or engines 132 (e.g., liquid-fueled engines) can then ignite and propel the upper stage 130 into a higher trajectory 134 for orbital insertion or other destinations. As the booster stage 110 reenters the earth's atmosphere, it reorients so that the aft end 112 is pointing in the direction of motion and glides toward the sea-going landing platform 150. In another embodiment, the booster stage 110 can reenter the atmosphere nose-first, and then reorient to a tail-first orientation just prior to landing. In yet another embodiment, landing rockets and/or a suitable landing gear structure can be mounted on the forward end 114 of the booster stage 110 so that the booster stage 110 can reenter the atmosphere nose-first, and land in a nose-down orientation.

Depending on the particular launch trajectory, the sea-going platform 150 may be located a hundred or more miles downrange from the coastal launch site 140. As the booster stage 110 descends toward the sea-going platform 150, the booster stage 110 can adjust its glide path to target the platform 150 based on platform positional data received from the broadcast station 152. In addition or alternatively, the sea-going platform 150 can include a submerged or partially submerged propulsion system (having, e.g., propellers or other propulsive devices) to hold the platform 150 in a predetermined position or move the platform 150 as needed to adjust for drift and/or changes in booster trajectory. One or more boats with cables can also be used to hold the platform 150 in position or move the platform 150 as needed to adjust for drift and/or changes in booster trajectory.

As the booster stage 110 descends toward the sea-going platform 150, the booster stage 110 can control its glide path using the aerodynamic control surfaces 118 positioned on the aft end 112, and/or the deployable control surfaces 120 positioned toward the forward end 114. In one aspect of this embodiment, the deployable control surfaces 114 can include aerodynamic surfaces that flare or deploy outwardly in the form of, e.g., a shuttlecock to create aerodynamic drag aft of the center of gravity (CG) of the booster stage 110 that helps to stabilize the booster stage 110 in a tail-first orientation. In another aspect of this embodiment, the moveable aerodynamic control surfaces 118 positioned toward the aft end 112 of the booster 110 can include bidirectional control surfaces that can control the attitude and/or trajectory of the booster stage 110 during both ascent when the vehicle 100 is moving in the forward direction and descent when the booster stage 110 is moving in the aft direction toward the sea-going platform 150. Accordingly, in one aspect of this embodiment the aerodynamic control surfaces 118 are bidirectional, supersonic control surfaces. In still further embodiments, a suitable parachute system can be deployed from, e.g., the forward end 114 of the booster stage 110 to reduce and/or otherwise control the rate of descent during all or a portion of the descent.

After the booster stage 110 has descended to a suitable position above the platform 150 (e.g., in some embodiments from about 100,000 feet to about 1,000 feet, or in other embodiments from about 10,000 feet to about 3,000 feet), it restarts the booster engines 116 to slow its descent. The booster stage 110 then performs a vertical, powered landing on the platform 150 at low speed. For example, the booster stage 110 can slow from a rate of descent of about 60 feet per second to about 1 foot per second or less, and can touch down on the landing platform 150 using gimbaling of the booster engines 116 and/or attitude control thrusters to control the attitude and/or position of the booster stage 110 during touch down. In one embodiment, the booster stage 110 can touch down on a suitable shock-absorbing landing gear. In other embodiments, other landing means can be employed to suitably land the booster stage 110 on the sea-going platform 150 in accordance with the present disclosure.

In another embodiment, one or more jet engines (not shown) can be suitably attached to the aft end 112 or other portion of the booster stage 110 to perform all or a portion of the vertical landing maneuvers. The jet engines can be started during booster stage descent, and can be used in combination with, or in place of, restarting the booster engines 116. Jet engines may be more fuel efficient than the booster engines 116 and, as a result, may provide more hover time and better control of the booster stage 110 during landing on the platform 150. In one embodiment, the jet engines can be used in combination with a suitable parachute system that deploys and decelerates the booster stage 110 before the jet engines are started.

In one embodiment, the sea-going platform 150 can be a free-floating, ocean-going barge with a suitable deck configured for landing and transporting the booster stage 110. In other embodiments, the platform 150 can be part of a more complex vessel, such as a semi-submersible platform having underwater thrusters to minimize or at least reduce deck motion and hold a fixed or relatively fixed position. In the barge embodiment, the sea-going platform 150 can be towed back to the coastal launch site 140 or other port after landing for reconditioning and/or refurbishment for reuse. In one embodiment, the sea-going platform 150 can be towed by a tug or other suitable vessel. In other embodiments, the sea-going platform 150 can include its own propulsion system to transport the booster stage 110 back to the launch site 140 or other port.

There are a number of advantages associated with the embodiments of the present disclosure described above with reference to FIG. 1. For example, recovering the booster stage 110 by landing on a sea-going platform reduces the costs associated with launching multi-stage orbital vehicles. Moreover, by performing a vertical powered landing, the booster stage is recovered in a way that minimizes or at least reduces the amount of reconditioning necessary for reuse. In addition, embodiments of the disclosure described above can improve operational flexibility of orbital launch vehicles because the ocean-going platform 150 can be moved to a different area of the ocean as the mission launch azimuth and/or downrange landing locations change. Moreover, the ocean-going platform 150 can even be moved to other parts of the world to support launches from other sites (e.g., other coastal launch sites). In addition to launching from coastal launch sites, the launch vehicle 100 can also be launched from sea on an ocean-going platform or vessel and then landed down range on the ocean-going platform 150. Such embodiments may be advantageous for equatorial launches from sea-based platforms to increase payload capability. Alternatively, in other embodiments the launch vehicle 100 can be launched from an ocean-going platform, and then the booster 110 can be recovered by performing a powered, vertical landing on land.

The embodiments of the disclosure described above can also increase the payload capability of the launch vehicle 100 by allowing the booster stage 110 to fly the most efficient, or at least a very efficient trajectory as it reenters the atmosphere and travels toward the platform 150. The payload capability is increased because no propellant needs to be retained by the booster stage 110 for flyback to a land-based landing site. Moreover, the sea-going platform 150 can be positioned in whatever location the booster stage 110 is predetermined to land after separation of the upper stage 130. The embodiments disclosed herein can also reduce or eliminate the public safety concerns associated with reversing the flight trajectory of the booster stage 110 for land-based landings.

The embodiments of the disclosure described above also solve the problem of how to transport the booster stage 110 back to either the coastal launch site 140 or other land-based reconditioning facility. More specifically, booster stages of launch vehicles are typically very large and, as a result, transporting them fully assembled can present significant logistical challenges and costs. If a booster stage were to land downrange on land, the problem of transporting the booster stage back to either the launch site or other reconditioning site would have to be solved, and land-based travel of something as large as a booster stage is logistically and financially challenging. In contrast, ocean transport is a cost-effective means of transporting large cargo, such as booster stages, long distances. The sea-going platform 150 of the present disclosure can be towed back to a harbor near the launch site and off-loaded for reconditioning and reuse relatively inexpensively.

Although FIG. 1 describes an embodiment of the disclosure in the context of recovering a booster stage, the present disclosure can also be applied to recovery of an orbital reentry vehicle with precision, vertical powered landing capability. One advantage of this approach is that it would allow the sea-going platform 150 to be positioned in any ocean area or other body of water (e.g., a sound, lake, etc.) suitable for landing a reentering vehicle. Moreover, multiple sea-going platforms could be placed around the world at predetermined locations to provide contingency landing zones if needed for an aborted mission.

Figure 2:
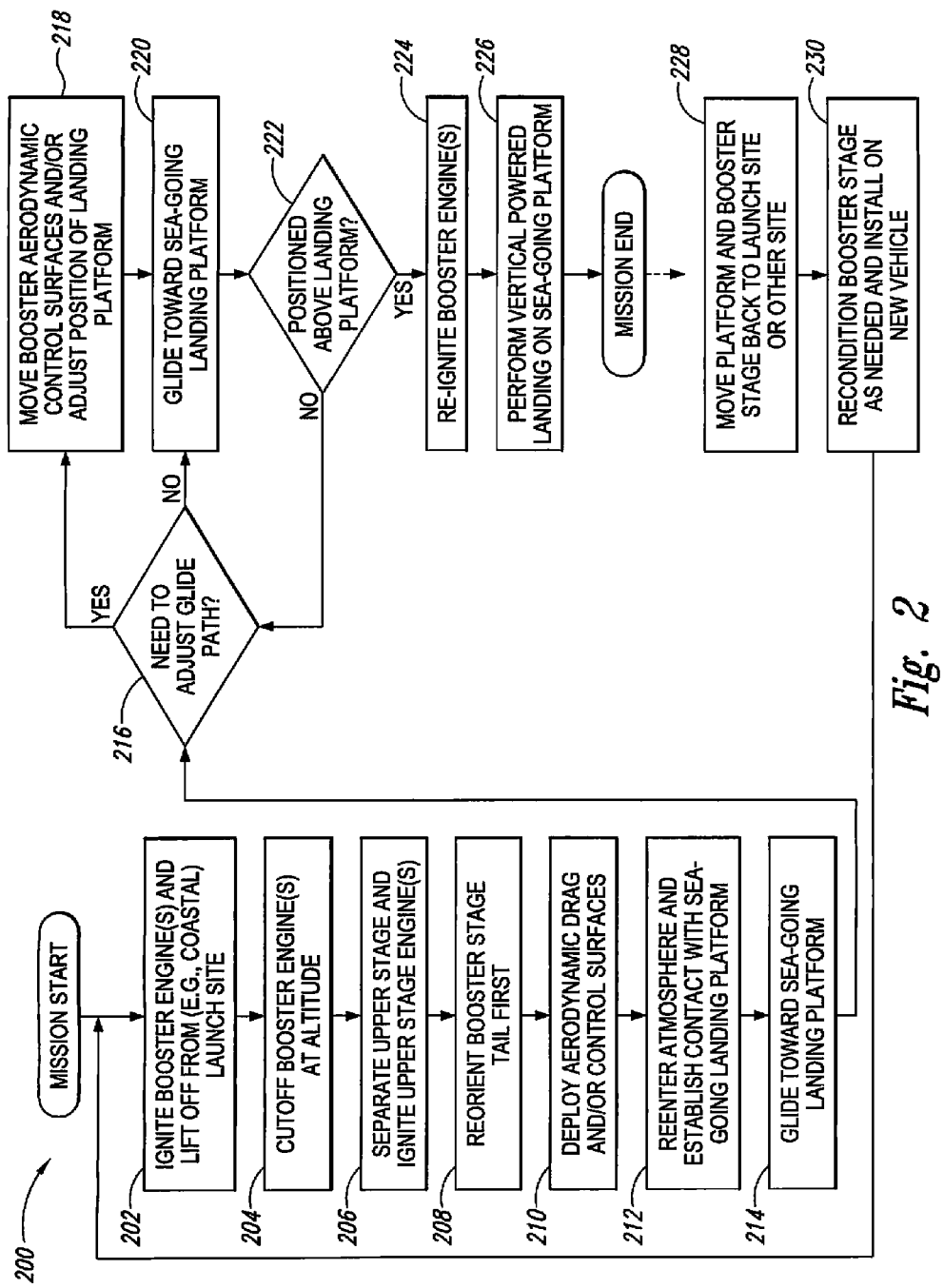
FIG. 2 is a flow diagram illustrating a routine for launching a space launch vehicle from a land-based or other launch site and landing the space launch vehicle on a sea-going platform in accordance with an embodiment of the disclosure.

FIG. 2 illustrates a flow routine 200 of a method for launching and landing a space launch vehicle, e.g., an orbital vehicle, in accordance with an embodiment of the disclosure. In one aspect of this embodiment, the routine 200 can be implemented by the launch vehicle 100 described above with reference to FIG. 1. In other embodiments, the routine 200 or portions thereof can be employed by other types of launch vehicles, including orbital launch vehicles, non-orbital launch vehicles, deep-space and inter-planetary vehicles, etc.

In block 202, the routine starts with booster engine ignition and liftoff from a launch site (e.g., a land-based launch site, such as a coastal launch site). As described above, in other embodiments the mission can begin with liftoff from a sea-based launch pad such as a floating platform, barge, ship or other vessel. In block 204, booster engine cutoff occurs at a predetermined altitude. In block 206, the upper stage separates from the booster stage and the upper stage engine or engines are started.

In block 208, the booster stage reorients as it follows its ballistic trajectory after upper stage separation. More particularly, the booster stage reorients so that it is traveling in a tail-first direction. In one embodiment, the reorientation of the booster stage can be accomplished using deployable aerodynamic surfaces (e.g., flared surfaces) which extend outwardly from the forward end of the booster stage to create drag aft of the CG of the booster stage. In other embodiments, thrusters (e.g., rocket thrusters, such as hydrazine thrusters) can be employed in addition to or instead of aerodynamic control surfaces to reorient the booster stage. For example, if reorientation of the booster stage occurs in space where aerodynamic control surfaces are ineffectual, then thrusters can be employed to reorient the booster stage.

In block 210, aerodynamic drag and/or control surfaces are deployed prior to or during reentry of the vehicle into the earth's atmosphere. In block 212, the booster stage reenters the atmosphere and establishes contact with a sea-going landing platform. Alternatively, the vehicle can establish contact with the sea-going landing platform before reentry, or it can be in constant contact with the sea-going platform during the entire flight. In block 214, the booster stage glides or otherwise follows a ballistic trajectory toward the sea-going landing platform.

In decision block 216, the routine determines if the glide path of the booster stage needs to be adjusted to properly position the booster stage over the sea-going platform. If not, the routine proceeds to block 220 and the booster stage continues gliding toward the sea-going platform. If glide path adjustment is needed, the routine proceeds to block 218 and moves the aerodynamic control surfaces to change the glide path of the booster stage. Alternatively, or in addition to changing the glide path of the booster stage, the routine can also adjust the position of the landing platform using, e.g., propulsion systems associated with the landing platform or by towing the platform.

After adjusting the glide path and/or the position of the landing platform, the routine proceeds to decision block 222 to determine if the booster stage is suitably positioned over the landing platform to prepare for the final stage of landing. If not, the routine returns to decision block 216 and repeats. Once the vehicle is in a suitable position over the landing platform to prepare for final landing procedures, the routine proceeds to block 224 and reignites the booster engines. In block 226, the vehicle performs a vertical powered landing on the sea-going platform, and the flight portion of the routine ends.

In one embodiment, however, the routine 200 can continue in block 228 by moving the platform and the booster stage back to the launch site or other port for reconditioning and reuse. In block 230, the booster stage is reconditioned as needed and installed on a new launch vehicle. From block 230, the routine returns to block 202 and repeats for the new vehicle.

In a particular embodiment, the sea-going platform can be positioned in a manner that improves and/or optimizes the second stage separation of the launch vehicle, e.g., both the azimuth and distance from the launch pad. For example, in at least some instances, the ability to move the sea-going platform can broaden the range of available locations at which the launch booster separates from the rest of the vehicle because the landing site of the booster is not so tightly constrained. The ability to control the trajectory of the booster's descent can further broaden the range of available landing sites.

In any of the foregoing embodiments, once the launch vehicle lands, the overall process can include additional steps to facilitate quickly returning the launch vehicle to service. For example, the launch vehicle can be transferred from a relatively slow-moving sea-going platform to a faster surface ship so as to reduce the time in transit back to the launch site. In addition to or in lieu of the transfer, the reusable launch vehicle can be refurbished while it is in transit from the landing site to the launch site. Aspects of both features are described further below in the context of a launch vehicle recovered at sea. In other embodiments, particular aspects of these features (e.g., refurbishing the launch vehicle en route from the landing site) may be applied to other recovery arrangements, including land-based recovery.

In a particular embodiment, the launch vehicle (e.g., a first stage reusable booster system or RBS) is immediately and/or autonomously put into a safe state after landing on the sea-going landing platform and before the processing crew approach the vehicle. Autonomous safety activities can include venting the propellant tanks and pressurant bottles and retracting any aerodynamic surfaces. The vehicle can then be transferred to a separate, smaller ship for faster return to a coastal launch site or transfer site. In another embodiment, the vehicle can be secured to the deck of the landing platform, and the platform can be towed or moved under its own propulsion back to a coastal launch site or a transfer site. In either case, the vehicle can be moved via a sea crane (or other suitable device) to secure the vehicle, whether in a vertical or a horizontal position for ocean transportation, and offloaded onto a truck at the dock for return to a vehicle processing facility at the launch site.

While en route and at the vehicle processing facility, the launch vehicle can be processed for the next launch. Turn-around activities that typically occur prior to each launch may include maintenance items (if any), cleaning, recharging gaseous presurrant bottles, recharging electrical batteries, refurbishing thermal protection system materials as needed, and/or functionally testing pneumatic, avionics and hydraulic subsystems. While en route or at the vehicle processing facility, the vehicle can be mated to an expendable upper stage, which can be pre-integrated with the payload and payload fairing. In other cases, the launch vehicle can be mated directly to a payload module. At periodic intervals, major maintenance activities such as engine overhaul can also be performed.

During the foregoing processing activities, if the overall system includes a single sea-going platform and it is used to transport the vehicle back to the coastal launch site, then the platform can be repositioned at the landing zone after offloading the vehicle, ready to land a second vehicle while the first vehicle is in transit back to the launch site. If the overall system includes two sea-going platforms, then one sea-going platform can remain in the landing zone between flights while the other returns to the coast. In still another embodiment, the system can include two launch vehicles, one sea-going landing platform, and a separate vessel that transports the vehicle from the platform to the launch site, which also allows one landing platform to remain in the landing zone between flights. The separate vessel can include a sea-going vessel or an airborne vessel in particular embodiments.

In any of the foregoing embodiments, any suitable aspect of the refurbishment process can be conducted while the vehicle is in transit, provided, for example, that the process may be successfully carried out in a marine environment, and is properly sequenced with subsequent processes.

From the foregoing, it will be appreciated that specific embodiments of the invention have been described herein for purposes of illustration, but that various modifications may be made without deviating from the spirit and scope of the various embodiments of the invention. For example, although various embodiments of the present disclosure have been described above in the context of landing a launch vehicle at sea, in other embodiments the systems and methods described herein can be used to land a launch vehicle on other bodies of water including, for example, a lake, a gulf, ocean, sound, or possibly even a large river. Further, while various advantages associated with certain embodiments of the disclosure have been described above in the context of those embodiments, other embodiments may also exhibit such advantages, and not all embodiments need necessarily exhibit such advantages to fall within the scope of the invention. Accordingly, the invention is not limited, except as by the appended claims.

We claim:

1. A method for operating a space launch vehicle, the method comprising:

launching the space launch vehicle from earth in a nose-first orientation, wherein launching the space launch vehicle includes igniting one or more rocket engines on the space launch vehicle;

reorienting the space launch vehicle to a tail-first orientation after launch;

positioning a landing structure in a body of water; and vertically landing the space launch vehicle on the landing structure in the body of water in the tail-first orientation while providing thrust from at least one of the one or more rocket engines.

2. The method of claim 1 wherein launching the space launch vehicle from earth includes launching the space launch vehicle from a launch site on land.

3. The method of claim 1 wherein the landing structure is a floating platform.

4. The method of claim 1, further comprising reusing at least a portion of the space launch vehicle.

5. The method of claim 1, further comprising:
transporting the space launch vehicle on the landing structure to a refurbishment facility;
refurbishing at least a portion of the space launch vehicle at the refurbishment facility; and
reusing at least a portion of the space launch vehicle after refurbishment.

6. The method of claim 1, further comprising transferring a reusable portion of the space launch vehicle from the landing structure to a transit vessel while the landing structure remains in the body of water to receive a subsequently launched vehicle.

7. The method of claim 1 wherein the space launch vehicle includes a payload carried on an upper stage mounted to a booster stage, wherein igniting one or more rocket engines includes igniting one or more rocket engines on the booster stage to launch the space launch vehicle from a launch site on land, wherein reorienting the space launch vehicle includes reorienting the booster stage to a tail-first orientation, and wherein the method further comprises:
turning off the one or more rocket engines on the booster stage;
separating the upper stage from the booster stage at a predetermined altitude;
receiving positional information from the landing platform and controlling a trajectory of the booster stage as is moves toward the landing platform in the tail-first orientation based on the positional information; and
reigniting the one or more rocket engines on the booster stage prior to landing, wherein the landing structure is a mobile landing platform, and wherein vertically landing the space launch vehicle includes vertically landing the booster stage on the mobile landing platform.

8. A method for transporting a payload to space, the method comprising:
coupling the payload to a booster stage of a rocket, the booster stage having a forward end portion spaced apart from an aft end portion and one or more rocket engines positioned toward the aft end portion;
positioning a floating platform in a body of water;
igniting at least one of the one or more rocket engines and launching the rocket toward space in a nose-first orientation;
turning off at least one of the ignited one or more rocket engines;
separating the payload from the booster stage;
after separating and turning off, reorienting the booster stage from the nose-first orientation to a tail-first orientation;
after reorienting, igniting at least one of the one or more rocket engines to decelerate the booster stage; and
landing the booster stage on the floating platform in the tail-first orientation, wherein landing the booster stage includes performing a powered, vertical landing of the booster stage on the platform.

9. The method of claim 8, further comprising:
after the booster stage has separated from the payload and followed a ballistic trajectory,
deploying an aerodynamic control surface from the booster stage to facilitate reorienting the booster stage from the nose-first orientation to a tail-first orientation.

10. The method of claim 8, further comprising:
operating one or more propulsive thrusters mounted to the booster stage to facilitate reorienting the booster stage from the nose-first orientation to a tail-first orientation.

11. The method of claim 8, further comprising:
moving an aerodynamic control surface on the booster stage to at least partially control a flight path of the booster stage toward the platform based on platform positional information received from the platform.

12. The method of claim 8:
wherein igniting at least one of the one or more rocket engines includes igniting a first rocket engine,
wherein turning off at least one of the one or more rocket engines includes turning off the first rocket engine, and
wherein, after reorienting, igniting at least one of the one or more rocket engines includes reigniting the first rocket engine.

13. A method for transporting a payload to space, the method comprising:
coupling the payload to a booster stage of a rocket, the booster stage having a forward end portion spaced apart from an aft end portion;
positioning a floating platform in a body of water;
igniting one or more rocket engines positioned toward the aft end portion of the booster stage and launching the rocket toward space in a nose-first orientation;
turning off the one or more rocket engines;
separating the payload from the booster stage;
after the booster stage has separated from the payload and followed a ballistic trajectory, deploying one or more flared control surfaces from the forward end portion of the booster stage to facilitate reorienting the booster stage from the nose-first orientation to a tail-first orientation; and
landing the booster stage on the floating platform in the tail-first orientation.

14. A system for providing access to space, the system comprising:
a space launch vehicle, wherein the space launch vehicle includes one or more rocket engines;
a launch site;
a sea going platform;
means for launching the launch vehicle from the launch site a first time, wherein the means for launching include means for igniting the one or more rocket engines and launching the vehicle in a nose-first orientation;
means for shutting off the one or more rocket engines;
means for reorienting the launch vehicle from the nose-first orientation to a tail-first orientation before landing;
means for reigniting at least one of the one or more rocket engines when the launch vehicle is in the tail-first orientation to decelerate the vehicle;
means for landing at least a portion of the launch vehicle on the sea going platform in a body of water, wherein the means for landing include means for landing in the tail-first orientation while the one or more rocket engines are thrusting; and
means for launching at least a portion of the launch vehicle from the launch site a second time.

15. The system of claim 14 wherein the means for landing include means for vertically landing at least a portion of the space launch vehicle on a floating platform.

* * * * *